Nov. 16, 1926.
T. F. WILLIAMS
BATTERY PLATE
Filed March 22, 1926
1,607,225
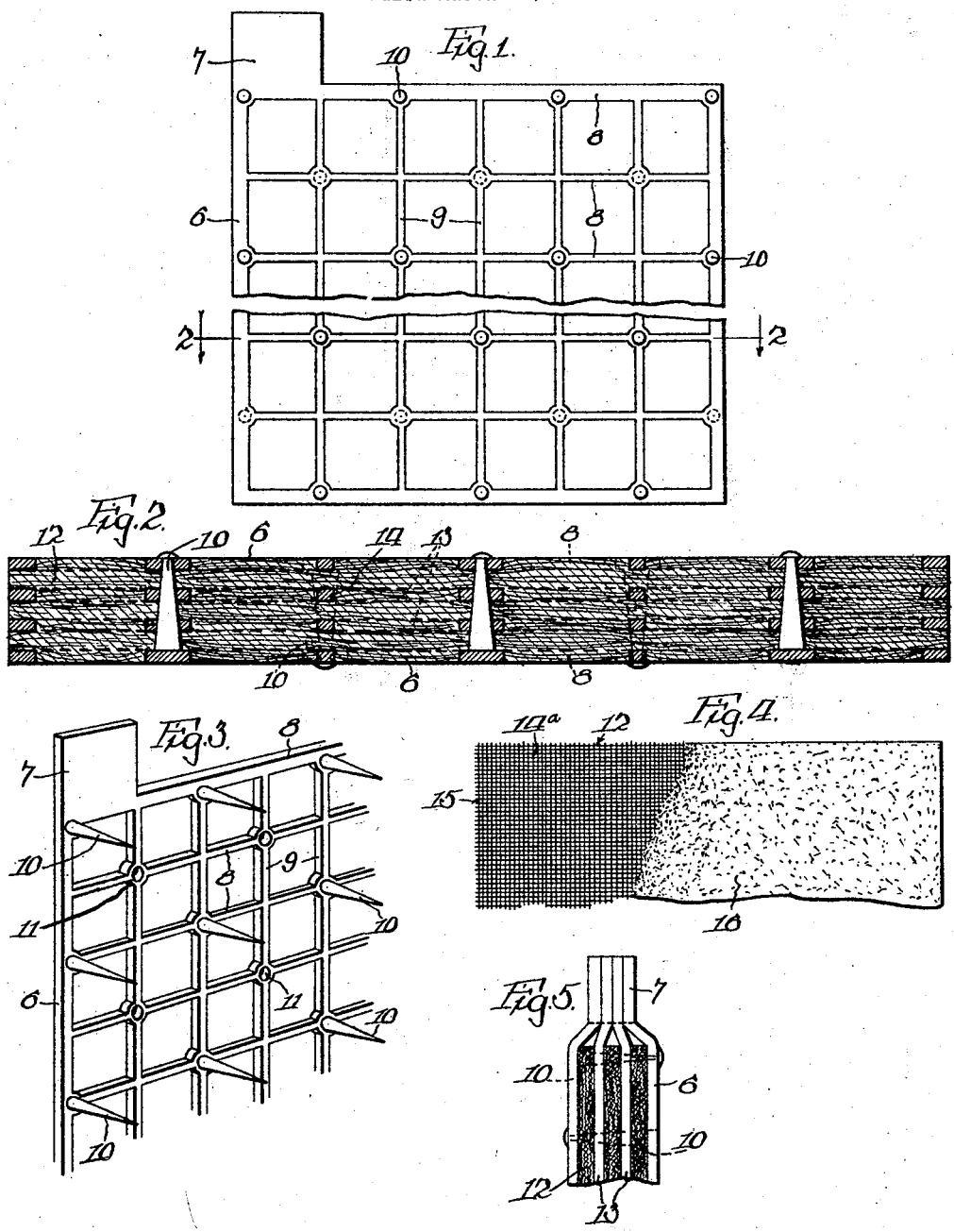

Patented Nov. 16, 1926.

1,607,225

UNITED STATES PATENT OFFICE.

TIMOTHY F. WILLIAMS, OF CHICAGO, ILLINOIS.

BATTERY PLATE.

Application filed March 22, 1926. Serial No. 96,461.

This invention relates to new and useful improvements in the plates of storage batteries, and it consists in certain peculiarities of the construction, novel arrangement and combination of the various parts thereof, as will be hereinafter more fully set forth and specifically claimed.

The invention has as one of its objects, to provide battery plates of much greater durability or of longer life, than ordinarily, by providing simple and effective means whereby the active material of such plates will be held in place throughout the entire unit, and besides, enabling the active material to be made harder than usual.

Another object of the invention is, to furnish battery plates of higher capacity than those heretofore produced, by providing means whereby the electrolyte will be carried to all sections of the plate, rather than to its surface only, as before, thereby obtaining full action of a much greater area.

A further object is, to eliminate or to reduce to a minimum, the deleterious expansion and contraction of battery plates, as the battery is discharged and charged, thus causing the grids, in lead batteries, to crack.

Other objects and advantages of the invention, will be disclosed in the following description and explanation, which will be more readily understood when read in conjunction with the accompanying drawing, which drawing illustrates an embodiment of which the invention is susceptible, it being understood that modifications and changes may be resorted to without a departure from the spirit of the invention, so long as they fall within the scope of the appended claim.

In the drawing:

Fig. 1 is a side view in elevation of a battery plate constructed according to the invention, showing it shortened for the convenience of illustration.

Fig. 2 is an enlarged sectional view taken on line 2, 2, of Fig. 1, looking in the direction indicated by the arrows.

Fig. 3 is a fragmental perspective view of one of the grids or outside members of each plate.

Fig. 4 is a face view of a portion of a netted or grated filler plate or sheet used between the grids or members of each battery plate and Fig. 5 is a fragmental edge view of the upper portion of one of the plates showing the position of the extensions for accommodating one of the terminals, when said extensions are united together.

Like numerals of reference refer to corresponding parts throughout the different views of the drawing. Each plate is, by preference rectangular in shape as shown, to be placed in a cell of similar shape, so that its terminal extensions may occupy a position at the upper part of the cell.

As will be clearly seen in Fig. 2, of the drawing, each plate consists of a pair of outside grids 6, which, in the formation of the plate are held spaced in parallel positions with respect to one another. Each of these outside grids or members is provided at one of its upper corners with a terminal extension 7, and with spaced bars 8, and 9. One of the outside grids 6, has arranged in horizontal and vertical spaced rows a series of projections or studs 10, which extend inwardly from the inner surface at the alternate junctures of the bars or grates. Each has at its alternate juncture between vertical rows of studs 10, an opening 11, to receive the studs or pins on the other outside grid or member, which is of the same construction as above described, except that its horizontal bars 8, are alternately provided with openings 11, to receive the pins or studs 10, on the first named member and with pins or studs on the inner surface of its alternate bars 8, disposed horizontally between the pins 10, of the first mentioned outside grid. The pins or studs 10, on each of said outside grids is preferably pointed, so that they can be easily riveted thereby securely holding the grids together, and also, so that they will readily pierce the knitted or grated porous sheets or members 12, the construction and explanation of which will be presently explained.

Interposed in spaced relation with one another, between the outside grids or members 6, are a plurality of inside grids or members 13, which like the members 6, are made of lead, but from which the pins are omitted. However, in proper places for the passage of said pins, each of the inside grids is provided with openings 14, to receive said pins, by which they are supported. It will be understood that the pins 10, are made of lead as well as the plates which carry them.

Mounted face to face on the pins 10, between each outside grid 6, and the grid 13, adjacent thereto, as well as between the last named grids, are a plurality of porous sheets 12, of netted linen or other suitable material the crossed threads of which, forming the net work, are of a capillary nature or character.

As shown in Fig. 4, each of the fibrous sheets 12, is made up of crossed threads 14, and 15, woven or fashioned so as to produce small net like openings. Each of these sheets 12, is treated to or with lead oxide 16, but in such a way that the ends of the crossed threads 14, and 15, may be exposed. The method of treating the sheets 12, with lead oxide may be of various kinds, such as by dipping the sheets into said material, or by coating the sides of said sheets with the said material, or in any other suitable manner. When thus treated it is apparent that the sheets 12, having the crossed threads 14ª, and 15, closely located one to another, will be axially porous and to some extent, porous transversely, as the lead oxide may not cover the threads in some places. Moreover it is apparent that the crossed threads 14, and 15, will afford capillary attraction for the electrolyte and thereby carry the same so that almost every particle of each sheet 12, and every particle of each of the grids 6, and 13, as well as the pins 10, will be reached.

In assembling the various parts of the plate, it will be understood, that a plurality of the sheets 12, may be pierced by the pins 10, of one of the outside grids and forced on said pins so as to lie on the inner surface of said grid, when, one of the inside grids 13, may be placed on said pins and forced to lie on the exposed or near the exposed surface of the plurality of sheets 12, which are located between the first named outside grid and the inside grid. This same operation is carried out with respect to the plurality of inside grids, and also with respect to the other outside grid and the inside grid adjacent thereto. When thus assembled the parts may be pressed together and the extensions 7, bent to lie against one another as shown in Fig. 5, of the drawing. In the above named operation it is obvious that the pins 10, will pierce the sheets 12 and will also pass through the openings therefor in the grids so that they may be clinched or riveted at their free ends.

By my improvements it is obvious, that undue expansion and contraction of the plate in the discharge and charging of the battery, will be compensated for or taken up by means of the webbing or netted sheets, and that as they provide capillary attraction as well as porosity, the electrolyte will be conducted to all parts of the plate, the openings in the grids and in the sheets, for the pins, permitting passage of the electrolyte to practically all portions of the active material.

Furthermore, it is apparent that the webbing or netted sheets are for holding the little particles of active material in place thereby prolonging the life of the plate besides increasing its capacity.

Having thus fully described my invention, what I claim as new and desire to secure by Letters Patent is:

In a battery plate, the combination of a pair of spaced apart outside grids each having on its inner surface transversely extended pins and each also having between said pins openings to receive the pins of the plates, with a plurality of inside grids spaced from one another and also from said outside grids, said inside grids having openings arranged to receive said pins, and a plurality of netted sheets each treated with lead oxide located between each outside grid and the inside grid adjacent thereto and also between the inside grids, said sheets having the said pins extended therethrough.

TIMOTHY F. WILLIAMS.